United States Patent
Saito et al.

(10) Patent No.: US 7,397,482 B2
(45) Date of Patent: Jul. 8, 2008

(54) STRING DISPLAY SYSTEM, STRING DISPLAY METHOD AND STORAGE MEDIUM

(75) Inventors: Mikio Saito, Tokyo (JP); Takao Yamagishi, Tokyo (JP)

(73) Assignees: Konami Corporation, Tokyo (JP); Konami Computer Entertainment Tokyo, Inc., Tokyo (JP)

( * ) Notice: Subject to any disclaimer, the term of this patent is extended or adjusted under 35 U.S.C. 154(b) by 135 days.

(21) Appl. No.: 11/070,218

(22) Filed: Mar. 3, 2005

(65) Prior Publication Data

US 2005/0248559 A1 Nov. 10, 2005

(30) Foreign Application Priority Data

Mar. 30, 2004 (JP) ............................. 2004-100387

(51) Int. Cl.
*G06T 11/00* (2006.01)
(52) U.S. Cl. ...................... 345/650; 715/788; 715/789
(58) Field of Classification Search ................ 715/788, 715/789; 345/650
See application file for complete search history.

(56) References Cited

U.S. PATENT DOCUMENTS 6,462,759 B1 * 10/2002 Kurtzberg et al. ........... 715/803

| | | | |
|---|---|---|---|
| 2003/0052901 A1 | 3/2003 | Fukuchi | |
| 2004/0036714 A1 | 2/2004 | Blakely et al. | |

FOREIGN PATENT DOCUMENTS

| EP | 0323381 | 7/1989 |
| JP | 5-252460 A | 9/1993 |
| JP | 2003-144758 A | 5/2003 |

* cited by examiner

*Primary Examiner*—Almis R. Jankus
(74) *Attorney, Agent, or Firm*—Sughrue Mion, PLLC

(57) ABSTRACT

A string display system for displaying display target strings includes a storage unit 50 that correlates and stores detection target strings and display numbers, a display time determination unit 56 that provisionally determines display times of the display target strings, and a detection unit 52 that detects the detection target strings included in the display target strings. The display time determination unit 56 conducts processing where, when the detection target strings are detected, the display numbers of the detection target strings are read from the storage unit 50, and the display times of the display target strings are shortened in accordance with the read display numbers. The string display system further includes a display unit 58 that displays the display target strings over the shortened display times of the display target strings.

7 Claims, 4 Drawing Sheets

FIG. 5

| DETECTION TARGET STRING | NUMBER OF CHARACTERS | DISPLAY NUMBER | NUMBER OF TIMES OF USE IN DISPLAY TARGET STRING |
|---|---|---|---|
| 東京 | 2 | 10 | 2 |
| OSAKA | 5 | 25 | 1 |
| 特許太郎 | 4 | 5 | 0 |
| ⋮ | ⋮ | ⋮ | ⋮ |

FIG. 6

| DISPLAY NUMBER | SHORTENING RATE |
|---|---|
| 1 ～ 10 | 0 |
| 11 ～ 20 | 0.01 |
| 21 ～ 30 | 0.02 |
| ⋮ | ⋮ |

STRING DISPLAY SYSTEM, STRING DISPLAY METHOD AND STORAGE MEDIUM

BACKGROUND OF THE INVENTION

The present invention relates to a string display system, a string display method and a storage medium, and in particular to technology for controlling the display time of strings.

Displaying display target strings on a computer is often used as part of HMI (Human Machine Interface). There are also many instances where systems that display such display target strings are configured to display the display target strings for a set period of time and then erase the display target strings from the screen of the computer.

In such string display systems, the display target strings have been displayed over a predetermined display time without the display time being changed depending on the content of the display target strings. For this reason, there has been the problem that the display target strings disappear before the person reading the display target strings has finished reading them, or conversely the person reading the display target strings becomes bored as a result of the display time being too long.

With respect to this point, JP-A-2003-144758 discloses an invention relating to displaying, over a display time determined on the basis of a message string to be displayed, that string.

However, within sentences, there are specific strings (words, phrases, etc.) where continuous characters have a specific meaning as a group. Often, in the process of a display target string being displayed numerous times, the same specific string is repeatedly displayed numerous times. In this case, as the number of times that a person reads the display target string increases, the speed at which the person reading the display target string reads the specific string portion included in the display target string sometimes becomes faster. Namely, there have been instances where the speed becomes faster as a result of the person reading the display target string becoming more familiar with the display target string. In spite of this, conventionally there have been instances where the display time has not always been suited to the speed at which a person reads the display target string because the display time has not been determined in consideration of this situation.

SUMMARY OF THE INVENTION

The present invention has been made in light of this situation, and it is an object thereof to provide a string display system, a string display method and a storage medium that can determine, in accordance with the number of times that a specific string is displayed, the display time of a display target string which includes that specific string.

In order to address this problem, an aspect of the invention provides a string display system for displaying a display target string, the string display system comprising: detection target string storage means for correlating and storing a detection target string, which is a string configured by one or more characters, and a display number of the detection target string; display target string acquisition means for acquiring the display target string; detection target string detection means for detecting the detection target string included in the display target string; display number reading means for reading the display number of the detection target string from the detection target string storage means when the detection target string is detected; display time determination means for determining a display time of the display target string in accordance with the display number that the display number reading means reads; and string display means for displaying the display target string across the determined display time of the display target string.

By configuring the invention in this manner, the display time of a display target string including a detection target string can be determined in accordance with the display number of that detection target string.

The string display system may further include display time provisional determination means for provisionally determining the display time of the display target string, wherein the display time determination means determines the display time by shortening the display time provisionally determined by the display time provisional determination means in accordance with the display number that the display number reading means reads. By configuring the invention in this manner, the display time of a display target string including a detection target string can be shortened in accordance with the display number of that detection target string.

The string display system may further include display time shortening rate storage means for correlating and storing a display time shortening rate with the display number of the detection target string, wherein the display time determination means shortens the display time provisionally determined by the display time provisional determination means on the basis of a value obtained by multiplying the display time pertaining to the detection target string portion by the display time shortening rate correlated with the display number of the detection target string that the display number reading means reads and stored by the display time shortening rate storage means. By configuring the invention in this manner, the display time can be shortened by the shortening rate corresponding to the display number of the detection target string.

Another aspect of the invention provides a string display method including the steps of: acquiring a display target string; detecting a detection target string included in the display target string and stored in detection target string storage means correlating and storing a detection target string configured by one or more characters and a display number of the detection target string; reading the display number of the detection target string from the detection target string storage means when the detection target string is detected; determining a display time of the display target string in accordance with the display number read in the reading step; and displaying the display target string across the determined display time of the display target string.

Still another aspect of the invention provides a computer-readable storage medium in which is stored a program causing a computer to function as: display target string acquisition means for acquiring a display target string; detection target string detection means for detecting a detection target string included in the display target string and stored in detection target string storage means correlating and storing a detection target string configured by one or more characters and a display number of the detection target string; display number reading means for reading the display number of the detection target string from the detection target string storage means when the detection target string is detected; and display time determination means for determining a display time of the display target string in accordance with the display number that the display number reading means reads.

BRIEF DESCRIPTION OF THE DRAWINGS

FIG. 5 is a diagram showing an example of a table stored in the computer pertaining to the embodiment of the invention; and FIG. 6 is a diagram showing an example of a table stored in the computer pertaining to the embodiment of the invention.

DETAILED DESCRIPTION OF THE INVENTION

An embodiment of the invention will be described in detail below on the basis of the drawings.

Figure 1:
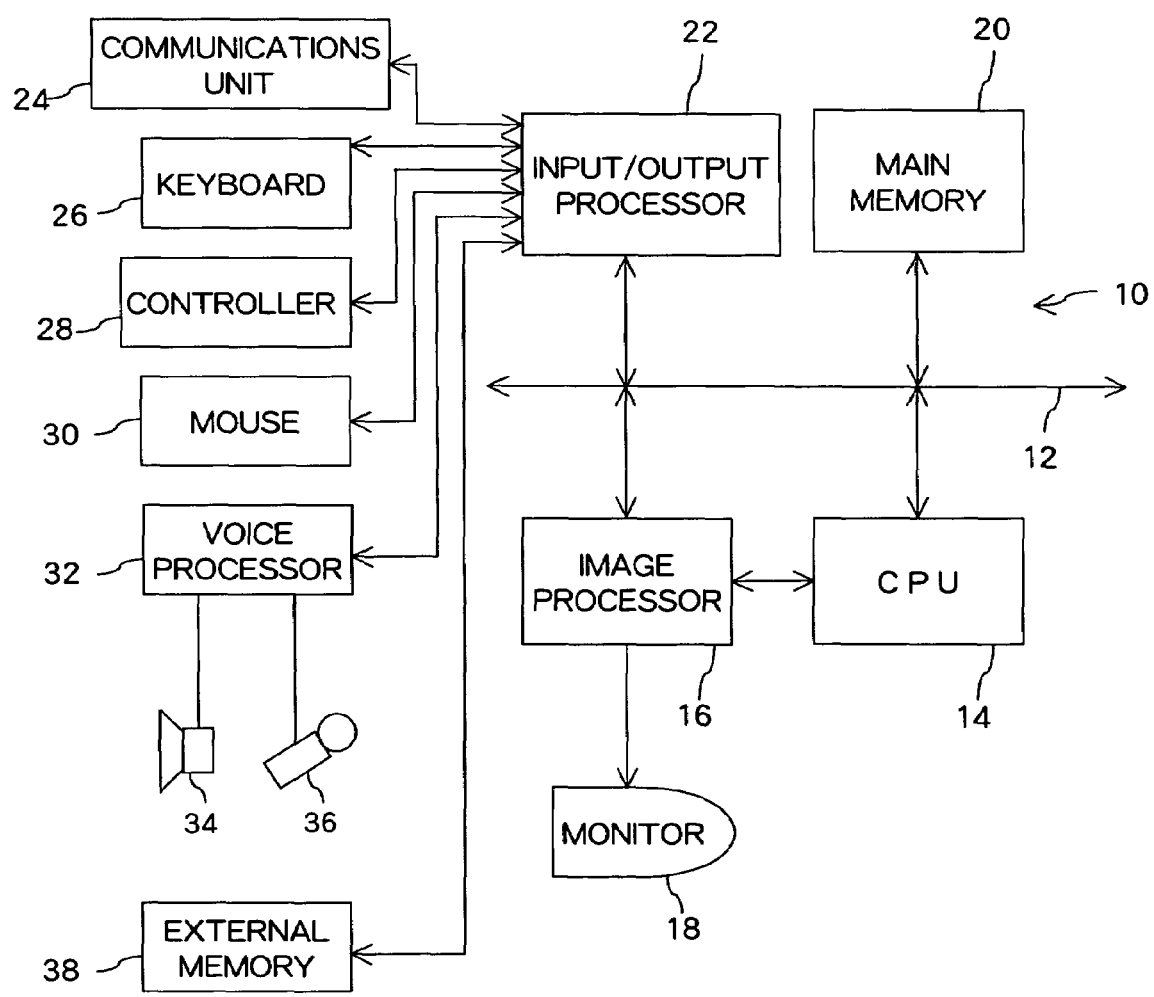
FIG. 1 is a diagram showing the hardware configuration of a computer pertaining to an embodiment of the invention.

FIG. 1 is a diagram showing the hardware configuration of a computer 10 used in the embodiment of the invention. The computer 10 is used as a string display system pertaining to one embodiment of the invention. The computer 10 is a general-purpose or dedicated information processing device. Examples thereof include personal computers, game terminals, mobile telephone terminals, mobile information terminals and information electronics. As shown in FIG. 1, the computer 10 is configured by a CPU 14, an image processor 16, a main memory 20 and an input/output processor 22. These constituent elements are interconnected via a bus 12. A communications unit 24, a keyboard 26, a controller 28, a mouse 30, a voice processor 32 and an external memory 38 are connected to the input/output processor 22. A monitor 18 is connected to the image processor 16. A display device that can notify a user of information, such as a display or an electric bulletin board, can be used for the monitor 18. A speaker 34 and a microphone 36 are connected to the voice processor 32.

A flexible disk, a CD-ROM, a CD-RW, a DVD-RAM, a USB Flash Memory, a ROM card or a removable disk can be used for the external memory 38. Namely, all computer-readable information storage media can be used. The external memory 38 stores computer programs and data.

Figure 2:
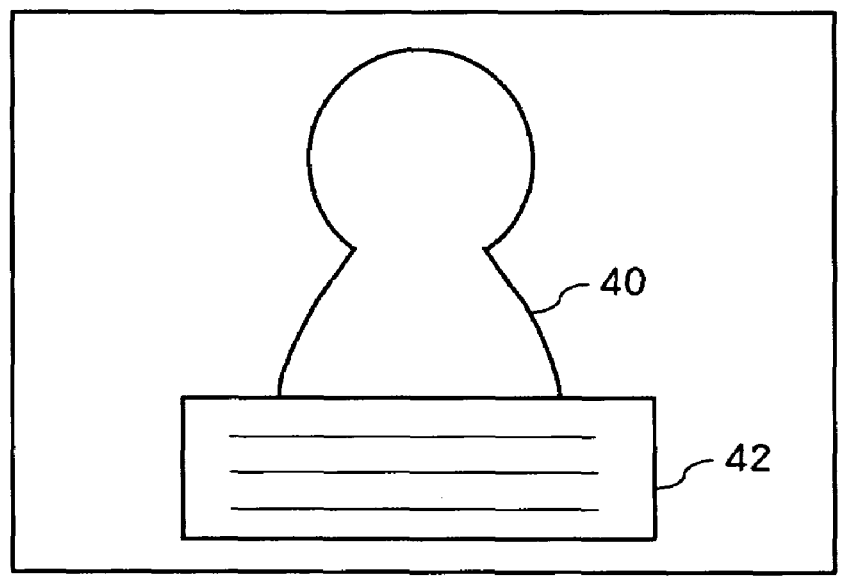
FIG. 2 is a diagram showing an example of a screen displayed on a display of the computer pertaining to the embodiment of the invention.

An example of a screen displayed on the monitor 18 of the computer 10 is shown in FIG. 2. FIG. 2 shows a screen that is displayed when the computer 10 is used as a system enabling dialog (an interactive interface) between the computer 10 and the computer user by displaying, on the monitor 18, a display target string acquired by the computer 10. In the present embodiment, a string display system is configured so that the display time during which a string used in a dialog is displayed on the monitor 18 can be determined in accordance with the number of times a specific string included in a display target string is displayed. This corresponds to the human characteristic of becoming familiar with a specific string as a result of reading that specific string numerous times. If, for example, the user of the computer 10 is not used to reading a specific string, then that specific string is displayed for a longer period of time so that the user can comfortably read display target strings sequentially displayed on the screen of the computer 10 without feeling so rushed that the user thinks, "I have to hurry up and read this." Conversely, if the user is used to reading a specific string, then the specific string is displayed for a shorter period of time so that excessive waiting time can be eliminated. For this reason, the user can comfortably read the string without feeling irritated that it is taking too long for the display to change. Specific examples include a case where an interactive game is executed in the computer 10. In the interactive game shown in FIG. 2, display target strings that the computer 10 displays are sequentially displayed as lines 42 of a character 40 displayed on the game screen. In this case, the user of the computer 10 can comfortably read those lines.

Figure 3:
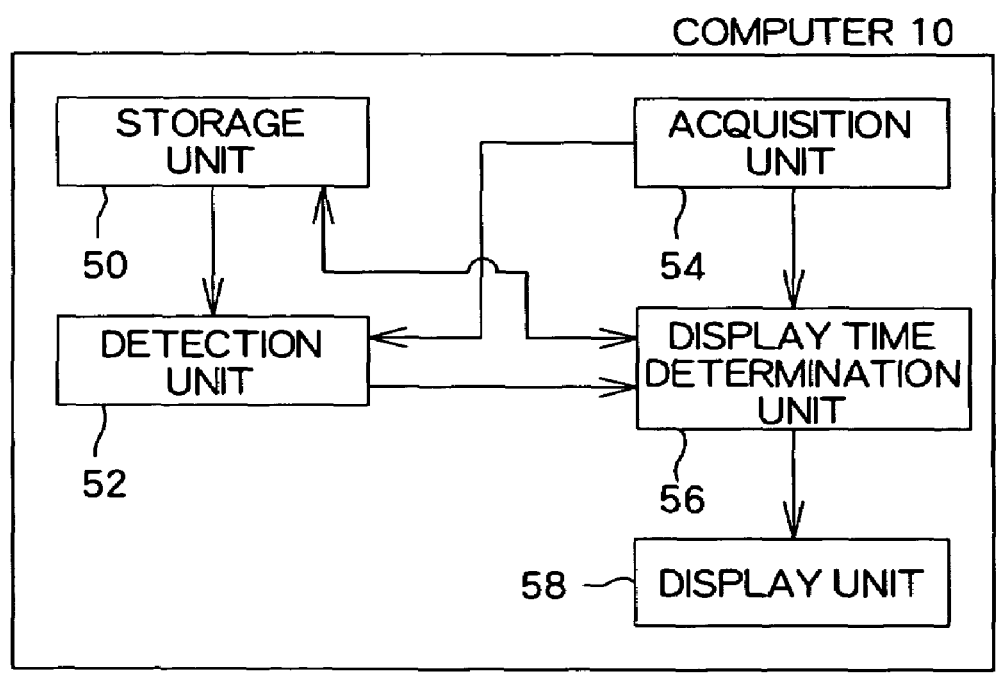
FIG. 3 is a functional block diagram of the computer pertaining to the invention.

A functional block diagram of the computer 10 used in the present embodiment is shown in FIG. 3. The computer 10 is functionally configured to include a storage unit 50, a detection unit 52, an acquisition unit 54, a display time determination unit 56 and a display unit 58. These are realized as a result of a predetermined program being executed in the computer 10. This program is stored in, for example, the aforementioned computer-readable information storage medium and is read by the external memory 38. Data stored in the storage unit 50 are physically stored in a storage device or medium, such as the main memory 20.

The storage unit 50 correlates and stores at least one detection target string and the display number of that detection target string (in this specification and in the attached claims, "display number" is used to mean the number of times a string has been displayed). The detection target string is a string configured by one or more characters used by the detection unit 52. The display number is data representing the number of times the detection target string has been displayed, which is updated each time the detection target string is displayed in the display unit 58. FIG. 5 is a diagram showing a specific example of a table stored in the storage unit 50. In this table, detection target strings and display numbers are correlated with one other and stored. The detection target strings may be stored by, for example, being manually inputted. When the processing described in the present embodiment is used in a game program, the detection target strings may be inputted when the game program is created, or the detection target strings may be stored as a result of the user of the computer 10 inputting the detection target strings using the keyboard 26, the controller 28, the mouse 30 or the microphone 36. As shown in the table of FIG. 5, the storage unit 50 also correlates and stores, with the detection target strings, the number of characters included in the detection target strings and the number of times that the detection target strings are used in display target strings acquired by the acquisition unit 54 (in FIG. 5, "Number of Times of Use in Display Target String"). Moreover, the storage unit 50 correlates and stores display numbers with shortening rates of display times when the display target strings are displayed in the display unit 58. FIG. 6 shows a specific example of this. In FIG. 6, display numbers and shortening rates are correlated with one other and stored.

The acquisition unit 54 acquires display target strings that serve as targets displayed on the monitor 18 in the display unit 58. Specifically, when, for example, a game program is executed in the computer 10, the acquisition unit 54 acquires strings that the game program is to display. The acquisition unit 54 may also acquire strings by receiving them from another computer via the communications unit 24. Then, the acquisition unit 54 outputs the display target strings to the detection unit 52 and the display time determination unit 56.

The detection unit 52 judges whether or not a detection target string stored in the storage unit 50 is included in an inputted display target string. Namely, the detection unit 52 judges whether or not a portion that matches a detection target string is present in a display target string. When a detection target string stored in the storage unit 50 is included in an inputted display target string, the detection unit 52 detects that detection target string in the display target string and outputs the detection target string to the display time determination unit 56.

The display time determination unit 56 provisionally determines the display time of the display target string inputted from the acquisition unit 54. Specifically, for example, the display time determination unit 56 may provisionally determine the display time in accordance with the content of the display target string, or may provisionally determine the display time regardless of the content of the string. When the display time determination unit 56 provisionally determines the display time in accordance with the content of the display target string, the display time determination unit 56 may provisionally determine the display time by, for example, multiplying a predetermined weighted constant by the number of characters in the display target string. In this case, the display time determination unit 56 may multiply weighted constants that differ per character type included in the display target string. Moreover, the display time determination unit 56 may multiply weighted constants that differ per continuity of character type included in the display target string. When the present invention is not to be applied, the display time may be the actual display time of the display target string.

Moreover, the display time determination unit 56 acquires the number of characters and display number correlated with the detection target string inputted from the detection unit 52 and stored in the storage unit 50. Then, the display time determination unit 56 shortens the display time of the display target string in accordance with the acquired display number. Specifically, the display time determination unit 56 first calculates the display time pertaining to the detection target string portion, for example. Namely, the display time determination unit 56 calculates the display time provisionally determined when the detection target string is used by itself as the display target string. Then, the display time determination unit 56 subtracts, from the provisionally determined display time of the display target string, a value obtained by multiplying a predetermined shortening rate by the display time pertaining to the detection target string portion. In this case, the predetermined shortening rate can be acquired by reading the shortening rate correlated with the acquired display number and stored in the storage unit 50. When the table stored in the storage unit 50 correlates and stores a range of display numbers and a shortening rate, the predetermined shortening rate can be acquired by reading the shortening rate correlated with the range including the acquired display number. In this manner, by shortening the provisionally determined display time of the display target string, the display time determination unit 56 can update the display time of the display target string. The display time determination unit 56 also increments, by 1, the number of times of use in the display target string correlated and stored with the detection target string in the storage unit 50. Namely, the display time determination unit 56 stores the fact that the detection target string has been used one time in the display target string.

The above processing in the detection unit 52 and the display time determination unit 56 for detecting the detection target string and updating the display time of the display target string in accordance with that detection target string is repeated for the number of times that detection target strings are detected in the display target string. For example, even when the same detection target string is plurally included in the display target string, the display time is updated in regard to each detection target string. Of course, the processing can also be changed in accordance with the number in which the same detection target string is included in the display target string. Similarly, the above processing is repeated in regard to all detection target strings stored in the storage unit 50. Additionally, the display time determination unit 56 updates the display time by conducting processing in which the value obtained by multiplying the predetermined shortening rate by the display time pertaining to the detection target string portion is subtracted from the previously updated display time. In this manner, the display time of the display target string continues to be updated each time a detection target string is detected in regard to the display target string. Then, the display time at the point in time when the repeated processing has ended for all is determined as the display time of the display target string and outputted to the display unit 58 together with the display target string.

The display unit 58 displays, on the monitor 18, the inputted display target string for the inputted display time. Namely, the display unit 58 begins displaying the inputted display target string and begins timekeeping, and when the time during which the display target string is being displayed reaches the inputted display time, the display unit 58 stops displaying the display target string.

Figure 4:
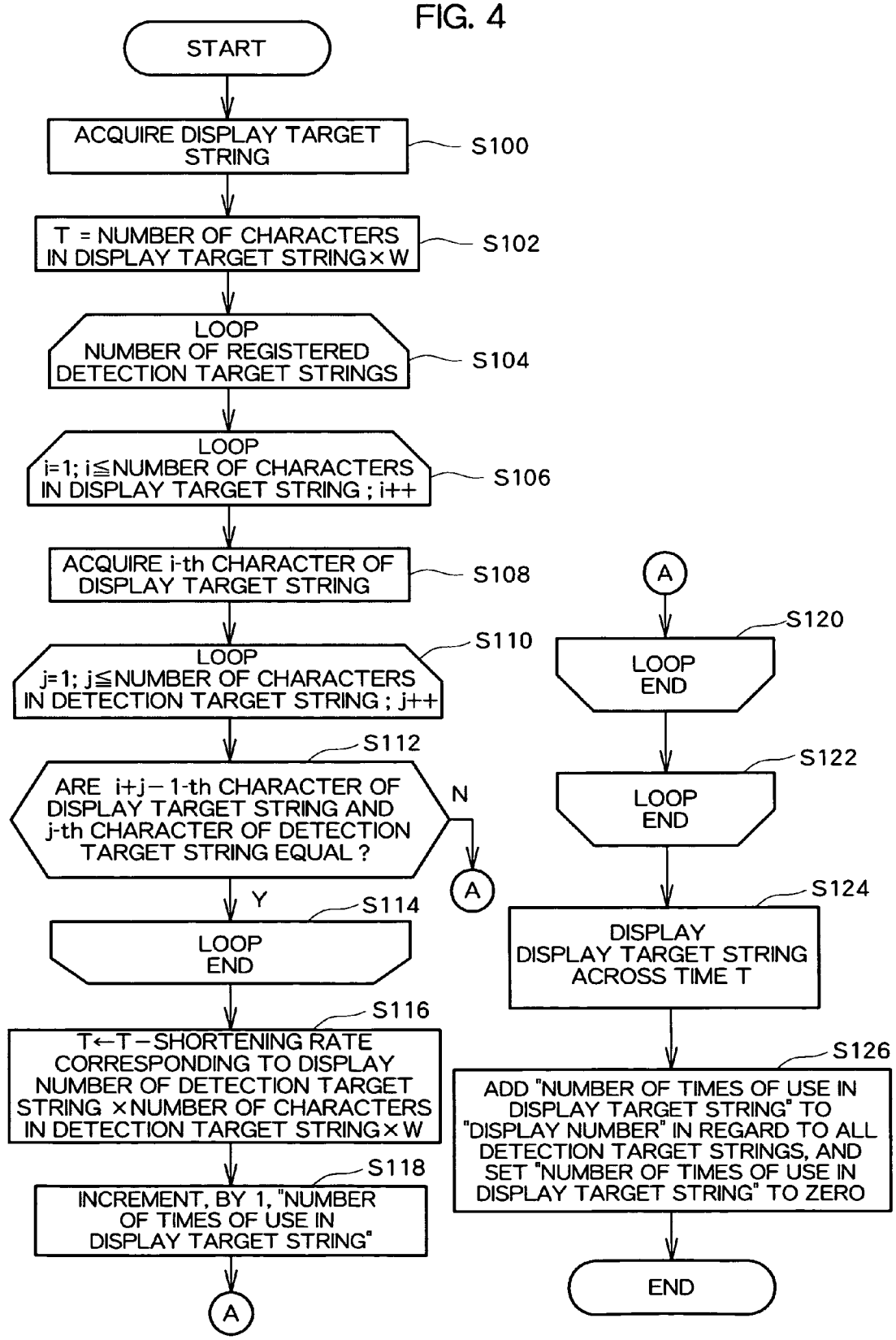
FIG. 4 is a flow chart showing computer processing pertaining to the embodiment of the invention.

A more specific example of the above processing will now be described with reference to the flow chart shown in FIG. 4.

First, the computer 10 acquires a display target string (S100). Then, the computer 10 secures a storage region for a variable T and assigns, to T, a value obtained by multiplying a constant W by the number of characters in the display target string (S102). W is a weighted constant, and is used for provisionally determining the display time by multiplying W by the number of characters in the display target string. T corresponds to the provisionally determined display time. As mentioned above, T can be provisionally determined using other methods, but here T is provisionally determined in this manner. Then, the processing of S106 to S120, which will be described now, is repeated using, as a number of repeat times, the number of detection target strings stored by being registered in the storage unit 50 (S104, S122).

Next, the computer 10 secures a storage region for a variable i, and repeats the processing of S108 to S118 while increasing the variable i incrementally, by 1, from 1 to the number of characters in the display target string (S106, S120). Namely, the computer 10 repeats the processing of S108 to S118 from the first character in the display target string to the last character.

Then, the computer 10 acquires the i-th character in the display target string (S108), and conducts the processing of S110 to S114 in order to judge whether or not the portion beginning with the i-th character in the display target string is equal to the detection target string.

First, the computer 10 secures a storage region for a variable j, and repeats the processing of S112 while increasing the variable j incrementally, by 1, from 1 to the number of characters in the detection target string (S110, S114). The number of characters may be acquired by reading the number of characters stored in the storage unit 50, or may be acquired by counting the number of characters in the detection target string during this processing. In S112, it is determined whether or not the i+j−1-th character in the display target string and the j-th character in the detection target string are equal. If they are not equal, then the portion beginning with the i-th character in the display target string and the detection target string are not equal, and the processing escapes from the loop of S110 and moves to the processing of S106. Namely, the processing returns to S106 to compare the portion beginning with the next character in the display target string with the detection target string.

When the i+j−1-th character in the display target string and the j-th character in the detection target string are equal in regard to all j's, the computer 10 updates the display time T (S116). Namely, when the portion beginning with the i-th character in the display target string and the detection target string are equal, the computer 10 updates the display time T (S116). More specifically, first, the computer 10 acquires the number of displays correlated with the detection target string and stored by the storage unit 50. Then, the computer 10 also acquires the shortening rate correlated with that number of displays and further stored by the storage unit 50. Then, the computer 10 subtracts, from T, the value obtained by multiplying the shortening rate by the display time of the detection target string obtained by multiplying the weighted constant W by the number of characters in the detection target string.

Then, the computer 10 increments, by 1, the number of times of use in the display target string correlated with the detection target string and stored in the storage unit 50 (S118).

After the above processing has been repeated in regard to all detection target strings, the display unit 58 displays the display target string during the display time T (S124).

The fact that the detection target string has been displayed is then reflected in the number of displays stored in the storage unit 50. For this purpose, the following addition processing is conducted in regard to all of the detection target strings stored in the storage unit 50. Namely, the number of times of use of the detection target strings in the display target strings correlated and stored with the display numbers are added to the display numbers. Next, the number of times of use in the display target strings are set to zero.

By configuring the invention in this manner, the computer can determine, in accordance with the display number of a detection target string, the display time of a display target string including that detection target string. Moreover, the computer can shorten the display time by the shortening rate corresponding to the display time of the detection target string. The computer can also determine, in accordance with the past display number of the detection target string, the shortening rate when shortening the display time. In other words, because the computer stores the result of the previous display, the computer can shorten the display time each time the display number increases.

It will be noted that the present invention is not limited to the embodiment described above.

For example, the storage unit 50 may be included in a different computer from the computer 10. In this case, the computer 10 conducts input/output processing with the storage unit 50 by communicating with the other computer via the communications unit 24. It is preferable to configure the invention in this manner particularly when the present embodiment is applied to a network game or chat system using a server. Also, the shortening rate does not have to be stored in the storage unit 50. In this case, the shortening rate may be calculated with a function where the display number is used as a variable. Also, the display unit 58 may be included in a different computer from the computer 10. In this case, the determination of the display time of the display target string and the display of that string are conducted in respectively different computers. Also, in the above embodiment, the display time was determined without including the display number of the detection target string included in the display target string to be displayed currently. However, the display time can also be determined in the following manner when determining the display time pertaining to the detection string in the latter portion of the display target string. Namely, assuming that the detection target string at the front portion of the display target string has already been displayed, the display number of the detection target string at that front portion can be included and determined when determining the display time. Also, a lower limit when the display time is shortened by shortening may also be prepared for the display time of the display string. The lower limit may be determined by the number of characters included in the display target string. Also, a lower limit may be prepared for each detection target string, and these lower limits may be determined by the number of characters included in the detection target strings.

The storage unit 50 may also correlate and store a time with the detection target string when the detection target string was previously displayed. When determining the display time of the display target string, the storage unit 50 may acquire the difference between the present time and the time stored by the storage unit 50 when the detection target string was previously displayed. The display time determination unit 56 may determine the shortening rate in accordance with this difference which is the amount of time that has elapsed since the detection target string was previously displayed. In other words, if the elapsed time is long, the storage unit 50 may conduct processing, such as reducing the shortening rate, so that the display time does not become too short. By doing so, the computer can determine the display time corresponding to the human characteristic of becoming familiar with a specific string by reading that specific string numerous times but forgetting the specific string as time passes.

Also, for example, in regard to a long word comprising seven or more characters, there are instances where the number of times the word must be read before one becomes familiar with the word is greater in comparison to a short word. In order to handle this, the invention may be configured so that the shortening rate is shortened in accordance with the length of the word, or so that the range of the display number stored in the storage unit 50 is increased when the word is long, or so that the processing for determining the display time is not applied. Similarly, the invention may be configured in accordance with the type of constituent characters in the detection target string (e.g., kanji, katakana, Roman letters, etc.), so that the shortening rate is shortened, or so that the range of the display number stored in the storage unit 50 is increased when the word is long, or so that the processing for determining the display time is not applied. When the ranges of the display numbers stored in the storage unit 50 are made different, it is preferable to prepare the table shown in FIG. 6 in accordance with the different targets.

Moreover, cases are also conceivable where, for example, when there are portions common to the strings stored as the detection target strings, the display numbers of those common portions become extremely large. In consideration of such cases, the invention may be configured to determine the display times in accordance with the display numbers of the portions that are not common.

What is claimed is:

1. A string display system for displaying a display target string, the string display system comprising:
   detection target string storage means for correlating and storing a detection target string which is a string configured by one or more characters, and a display number of the detection target string;
   display target string acquisition means for acquiring the display target string;
   detection target string detection means for detecting the detection target string included in the display target string;
   display number reading means for reading the display number of the detection target string from the detection target string storage means when the detection target string is detected;
   display time determination means for determining a display time of the display target string in accordance with the display number that the display number reading means reads; and string display means for displaying the display target string across the determined display time of the display target string.

2. A string display system for displaying a display target string, the string display system comprising:
   detection target string storage means for correlating and storing a detection target string which is a string configured by one or more characters, and a display number of the detection target string;
   display target string acquisition means for acquiring the display target string;
   detection target string detection means for detecting the detection target string included in the display target string;
   display number reading means for reading the display number of the detection target string from the detection target string storage means when the detection target string is detected;
   display time determination means for determining a display time of the display target string in accordance with the display number that the display number reading means reads; and
   string display means for displaying the display target string across the determined display time of the display target string, and
   further comprising display time provisional determination means for provisionally determining the display time of the display target string, wherein the display time determination means determines the display time by shortening the display time provisionally determined by the display time provisional determination means in accordance with the display number that the display number reading means reads.

3. The string display system of claim 2, further comprising display time shortening rate storage means for correlating and storing a display time shortening rate with the display number of the detection target string, wherein the display time determination means shortens the display time provisionally determined by the display time provisional determination means on the basis of a value obtained by multiplying the display time pertaining to the detection target string portion by the display time shortening rate correlated with the display number of the detection target string that the display number reading means reads and stored by the display time shortening rate storage means.

4. A string display method comprising the steps of:
   acquiring a display target string;
   detecting a detection target string included in the display target string and stored in detection target string storage means, which correlates and stores a detection target string configured by one or more characters and a display number of the detection target string;
   reading the display number of the detection target string from the detection target string storage means when the detection target string is detected;
   determining a display time of the display target string in accordance with the display number read in the reading step; and
   displaying the display target string across the determined display time of the display target string.

5. A computer-readable storage medium in which is stored a program causing a computer to function as:
   display target string acquisition means for acquiring a display target string;
   detection target string detection means for detecting a detection target string included in the display target string and stored in detection target string storage means correlating and storing a detection target string configured by one or more characters and a display number of the detection target string;
   display number reading means for reading the display number of the detection target string from the detection target string storage means when the detection target string is detected; and
   display time determination means for determining a display time of the display target string in accordance with the display number that the display number reading means reads.

6. A string display method comprising the steps of:
   acquiring a display target string;
   detecting a detection target string included in the display target string and stored in detection target string storage means, which correlates and stores a detection target string configured by one or more characters and a display number of the detection target string;
   reading the display number of the detection target string from the detection target string storage means when the detection target string is detected;
   determining a display time of the display target string in accordance with the display number read in the reading step; and
   displaying the display target string across the determined display time of the display target string,
   further comprising:
   provisionally determining the display time of the display target string, and
   wherein the display time is determined by shortening a provisionally determined display time in accordance with the read display number.

7. A computer-readable storage medium in which is stored a program causing a computer to function as:
   display target string acquisition means for acquiring a display target string;
   detection target string detection means for detecting a detection target string included in the display target string and stored in detection target string storage means correlating and storing a detection target string configured by one or more characters and a display number of the detection target string;
   display number reading means for reading the display number of the detection target string from the detection target string storage means when the detection target string is detected; and
   display time determination means for determining a display time of the display target string in accordance with the display number that the display number reading means reads,
   further comprising:
   correlating and storing a display time shortening rate with the display number of the detection target string, wherein the display time that is provisionally determined is shortened on the basis of a value obtained by multiplying the display time pertaining to the detection target string portion by the display time shortening rate correlated with the read and stored display number of the detection target string.

* * * * *